(12) United States Patent
Yanaru et al.

(10) Patent No.: US 6,467,513 B1
(45) Date of Patent: Oct. 22, 2002

(54) METHOD FOR PACKING CATALYST AND DEVICE THEREFOR

(75) Inventors: Hideaki Yanaru; Hitoshi Nakamura; Yuzuru Yanagisawa, all of Chiba (JP)

(73) Assignee: Toyo Engineering Corporation, Tokyo (JP)

( * ) Notice: Subject to any disclaimer, the term of this patent is extended or adjusted under 35 U.S.C. 154(b) by 0 days.

(21) Appl. No.: 09/455,379

(22) Filed: Dec. 6, 1999

(30) Foreign Application Priority Data

Dec. 25, 1998 (JP) .......................................... 10-378300
Sep. 29, 1999 (JP) .......................................... 11-276591

(51) Int. Cl.⁷ ................................................. B65B 1/20
(52) U.S. Cl. .......................... 141/12; 141/73; 141/82; 141/286; 141/374; 141/382
(58) Field of Search .................................. 141/1, 11, 12, 141/63, 64, 69, 71, 73, 82, 285, 286, 374, 382; 222/406, 407, 564; 366/332, 318; 239/379; 15/104.2, 164

(56) References Cited

U.S. PATENT DOCUMENTS

| 4,402,349 A | * | 9/1983 | Engert et al. ................ 141/248 |
| 4,424,837 A | * | 1/1984 | Farrell ......................... 141/284 |
| 5,247,970 A | * | 9/1993 | Ryntveit et al. ............... 141/1 |

* cited by examiner

*Primary Examiner*—Timothy L. Maust
(74) *Attorney, Agent, or Firm*—Oblon, Spivak, McClelland, Maier & Neustadt, P.C.

(57) ABSTRACT

In a reactor in which reaction tube(s), cooling tubes, heating tubes or combinations thereof are provided, a method for packing a catalyst comprising a step of packing the catalyst in the space formed between the inner wall of the reactor and the outer walls of the tubes by passing the catalyst through a flexible tube provided in the inside of the reactor and having a means to absorb the impact to the catalyst and thereby feeding the catalyst along the inner wall of the reactor with the falling distance of the catalyst maintained within a certain range and a step of fluidizing the catalyst thus-packed in said space, and a device for effecting the method.

7 Claims, 11 Drawing Sheets

METHOD FOR PACKING CATALYST AND DEVICE THEREFOR

FIELD OF THE INVENTION

The invention relates to a method for packing a catalyst and a device therefor. More specifically, the invention relates to a method for packing a catalyst quickly and uniformly in the space formed between the inner wall of a reactor in which a plural number of reaction tube(s), cooling tubes, heating tubes or combinations thereof are provided, and the outer walls of the tubes, and a device therefor.

DESCRIPTION OF THE RELATED ART

As illustrated in ammonia synthesis reactors, methanol synthesis reactors and the like, there are a variety of synthesis processes in each of which a catalyst is filled in a plural number of reaction tubes arranged in the reactor to obtain a desired product. In these processes, various methods are devised to fill the catalyst in the inside of the reaction tubes. An example teaches that a given amount of a catalyst is put in, what is called, a sock having a function capable of opening at the tip, the sock being then inserted into each reaction tube, and the tip of the sock is opened at an appropriate position in the tube to fill the catalyst therein (referred to as the sock method hereunder). In this method, however, prior to filling the catalyst in the sock, it is necessary to measure each time the amount of the catalyst to be packed in the reaction tube to prepare the sock so that it may be inserted into the reaction tube. Accordingly, the sock method takes too much time to be said suitable.

As another method for filling a catalyst in the inside of reaction tubes, the Norsk Hydro method is disclosed in Ammonia Plant Safety, vol. 133, p 18. FIG. 11 is a schematic diagram showing an embodiment thereof. The method aims at packing a catalyst in the inside of a reaction tube. In FIG. 11, a catalyst packing device 60 composed of a jig 70 equipped with brushes 80 and a lead-in pipe 90 for introducing a catalyst 5 is provided on a fixed reaction tube 20. The jig 70 equipped with the brushes 80 is inserted, while being rotated, into the reaction tube 20 to regulate the falling speed of the catalyst 5 sent from the lead-in pipe 90 by means of the brushes 80 thereby to absorb the impact. of the falling. Thus the catalyst 5 is allowed to fall down at a given position in the reaction tube 20 so that it may be packed therein. The reaction tube preferably has at least a diameter equivalent to the total size of several pieces of the catalyst 5. However, the catalyst 5 is uniformly packed by this method on the whole, even though the diameter is not so large as described above.

Aside from the processes for filling a catalyst in the inside of reaction tubes as described above, there is a process for filling a catalyst in the outside of tubes. In this process, in a reactor in which a plural number of reaction tube(s) and cooling tubes or reaction tube(s) and heating tubes are provided, a catalyst is packed uniformly in the space formed by the inner wall of the reactor and the outer walls of the reaction tube(s) and the other tubes. The reactor formerly disclosed by the applicant:in Japanese Patent Laid-Open No. 149640/1980 is an example of the latter process.

In the aforesaid reactor in which a plurality of tubes including reaction tube(s) and cooling tubes or reaction tube(s) and heating tubes are provided, the method for packing a catalyst according to the abovementioned Norsk Hydro method is effective as one of the processes for filling a catalyst in the inside of the reaction tubes. However, the method is not adequate for filling a catalyst uniformly in the space formed by the inner wall of the reactor and the outer walls of the tubes.

To fill a catalyst in the space described above, the sock method has been used, although it takes too much time and labor, because there is no other suitable packing method available.

As described above, in a reactor in which a plural number of tubes are provided, it has been expected to propose a method for packing a catalyst quickly and uniformly in the space formed by the inner wall of the: reactor and the outer walls of the tubes, and a device therefor.

SUMMARY OF THE INVENTION

It is an object of the present invention to provide a method for packing a catalyst uniformly and quickly in the space formed by the inner wall of a reactor and the outer walls of tubes, in the reactor in which a plurality of the tubes are provided, and a device therefor.

The inventors have made intensive investigation to solve the above described problems. As a result, it has been found that, in filling uniformly a catalyst in the space formed by the inner wall of a reactor and the outer walls of tubes, in the reactor in which a plural number of the tubes are provided, (1) the catalyst is passed through a flexible tube, arranged in the inside of the reactor and having a means to absorb the impact to the catalyst, and then fed along the inner wall of the reactor with the falling distance of the catalyst maintained within a certain range so that the catalyst is piled in the space, (2) the catalyst thus-piled at an angle exceeding its angle of repose flows out spontaneously to cover the bottom of the reactor so that it is packed ununiformly but over the whole area of the bottom of the reactor, (3) the catalyst ununiformly packed in this way is made uniform by fluidization, (4) no catalyst collapses by proper selection of the conditions for the packing method and the fluidization, and (5) the packing time is extremely reduced.

The present invention has been devised in view of the aforesaid circumstances, and the object of the invention is achieved by the method and device described hereinbelow.

In a method for packing a catalyst comprising filling the catalyst in the space formed by the inner wall of a reactor and the outer walls of tubes, in the reactor in which a plural number of at least one kind of the tubes selected from the group consisting of reaction tube(s), cooling tubes and heating tubes are provided, the steps of packing the catalyst in said space by passing the catalyst through a flexible tube arranged in the inside of the reactor and having a means to absorb the immpact to the catalyst and thereby feeding the catalyst along the inner wall of the reactor while maintaining the falling distance of the catalyst within a certain range so that the catalyst may not be broken, and of fluidizing the catalyst thus-packed in said space.

A device for packing a catalyst in the space formed by the inner wall of a reactor and the outer walls of tubes, in the reactor in which a plural number of at least one kind of the tubes selected from the group consisting of reaction tube(s), cooling tubes and heating tubes are provided, comprising a means for packing the catalyst in said space by passing the catalyst through a flexible tube arranged in the inside of the reactor and having a means to absorb the impact to the catalyst and thereby feeding the catalyst along the inner wall of the reactor while maintaining the falling distance of the catalyst within a certain range so that the catalyst may not be broken, and a means for fluidizing the catalyst thus-packed in said space.

DESCRIPTION OF THE PREFERRED EMBODIMENTS

The present invention is described with reference to the drawings. The codes used in FIGS. 1–10 are common to those drawings.

It goes without saying that in packing a catalyst uniformly in the space formed, in the inside of a reactor, between the inner wall of the reactor and the outer walls of tubes in the reactor in which a plurality of the tubes are provided, the present invention is not limited to the inventions described in FIGS. 1–10 hereunder.

Figure 5:
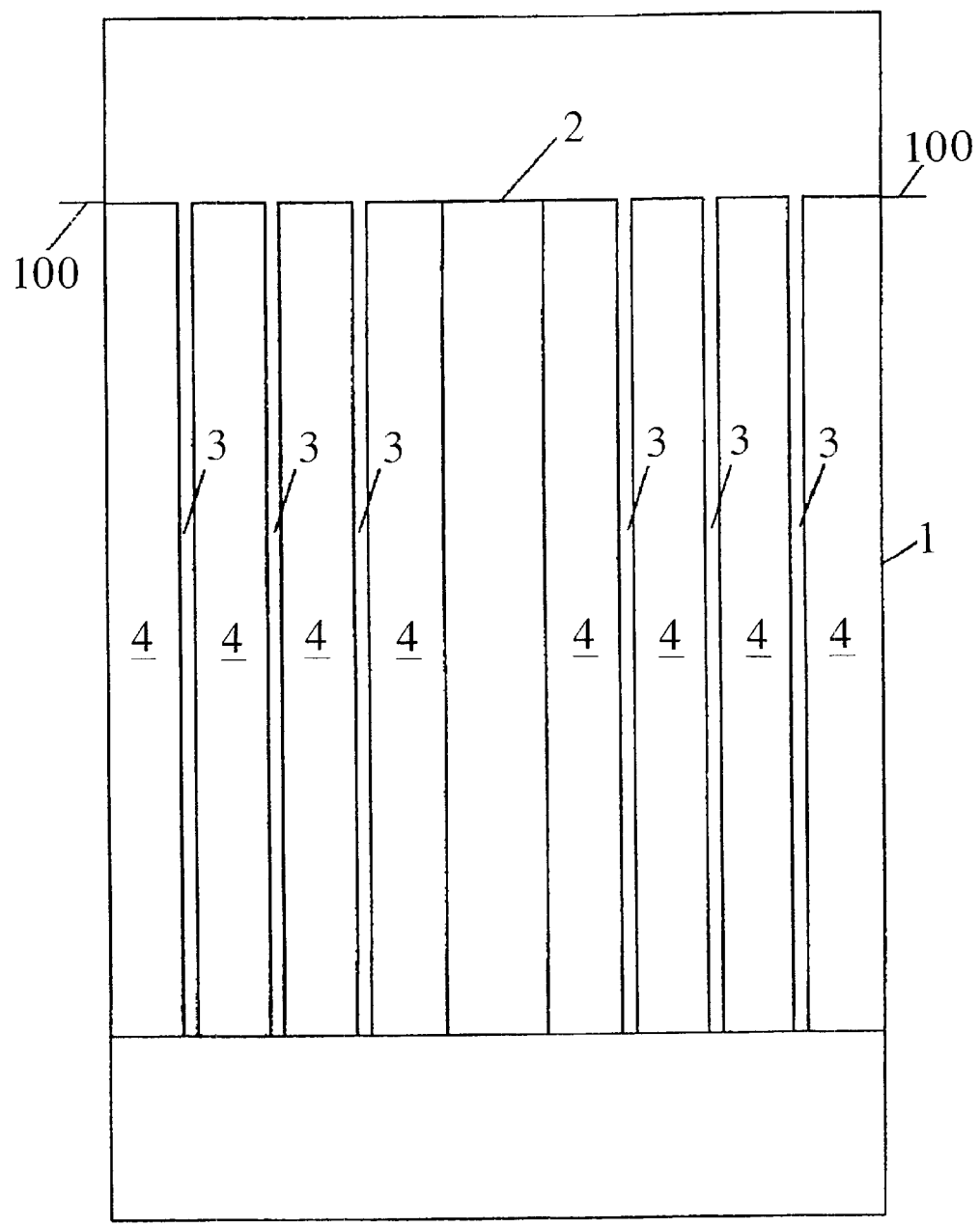
FIG. 5 is a front view of an example of a reactor to which the present invention is applied.
Figure 6:
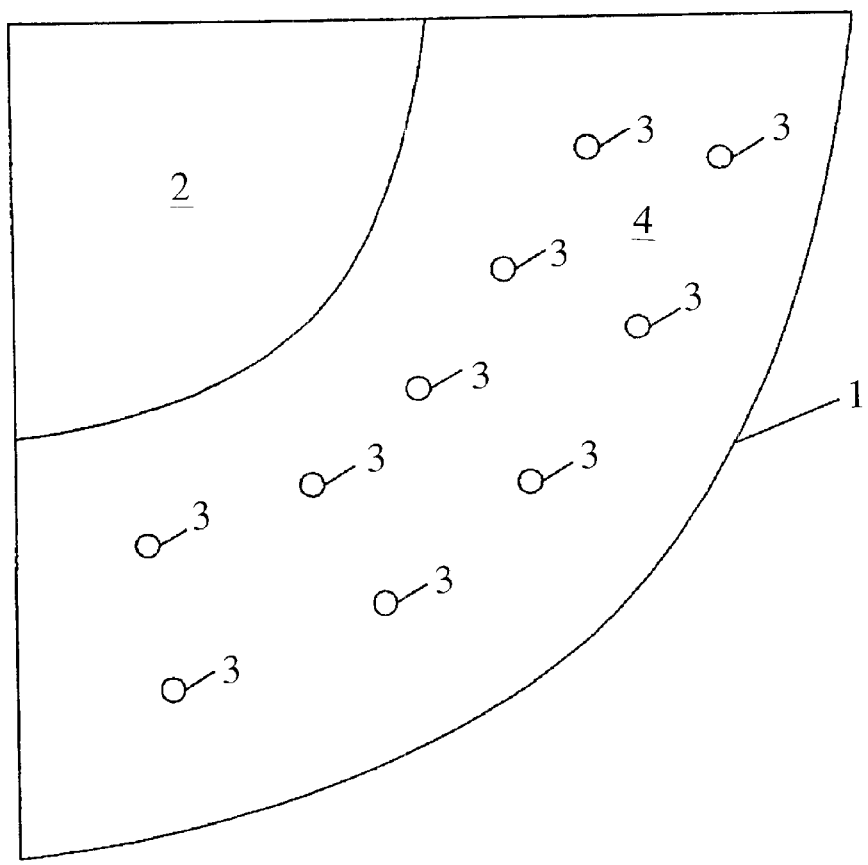
FIG. 6 is a schematic diagram illustrating a fourth part of a cross section of the reactor in FIG. 5.

The reactor in the present invention is now illustrated. FIG. 5 is a front view of an example of a reactor to which the present invention is applied. FIG. 6 is a schematic diagram showing a fourth part (quarter) of a cross section thereof.

In FIGS. 5 and 6, a reactor 1 comprises a reaction tube 2 and a plural number of tubes 3. Here, the space 4 is made up of spaces between the reactor 1 and each next tube 3, between every neighboring tubes 3 and between each next tube 3 and the reaction tube 2. A catalyst described in detail later is packed up to the lower face of a flange 100 (referred to as the flange face hereunder) shown in FIG. 5.

A description is made on a device for packing a catalyst uniformly in the space formed by the inner wall of a reactor and the outer walls of tubes in the reactor in which a plural number of the tubes are provided and a packing method therefor according to the present invention.

Figure 1:
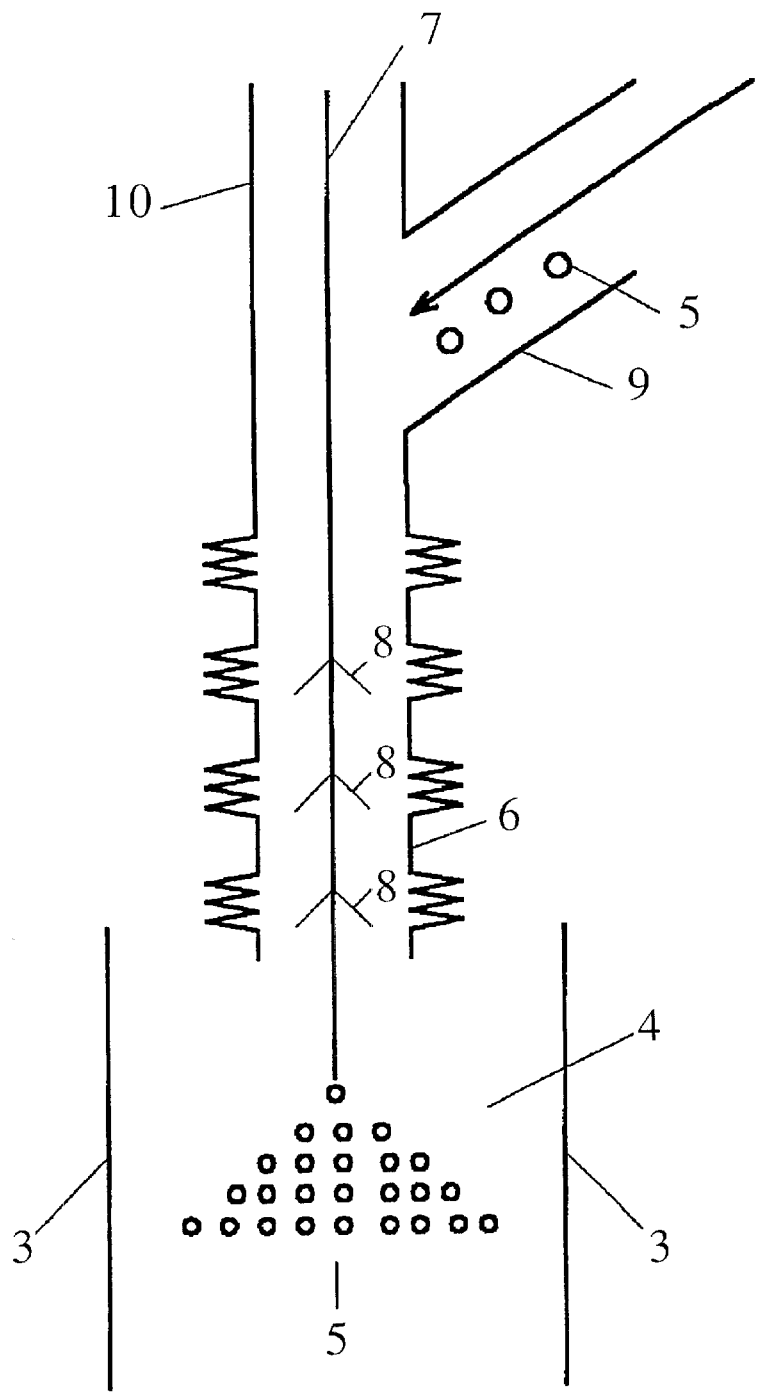
FIG. 1 is a schematic diagram illustrating an embodiment of the present invention.

FIG. 1 is a schematic diagram illustrating an embodiment of the present invention. In FIG. 1, a catalyst packing jig 10 is composed of a catalyst lead-in part 9, a flexible tube 6, and a jig 7 equipped with brushes 8 which is inserted into the flexible tube. Although not illustrated in the drawing, the catalyst packing jig 10 is so constructed that it can be separated off and combined with the flexible tube 6 at a section lower than the catalyst lead-in part 9, and the flexible tube 6 also has a structure capable of being separated and united at 0.5–1.0 m intervals. Further, the jig 7 equipped with the brushes 8 which is inserted in the flexible tube also has a structure capable of being separated and united in the range of 0.5–2 m and therefore the tube can be controlled in length. It is needless to say that the catalyst packing jig 10 can be used in a plural number.

Figure 4:
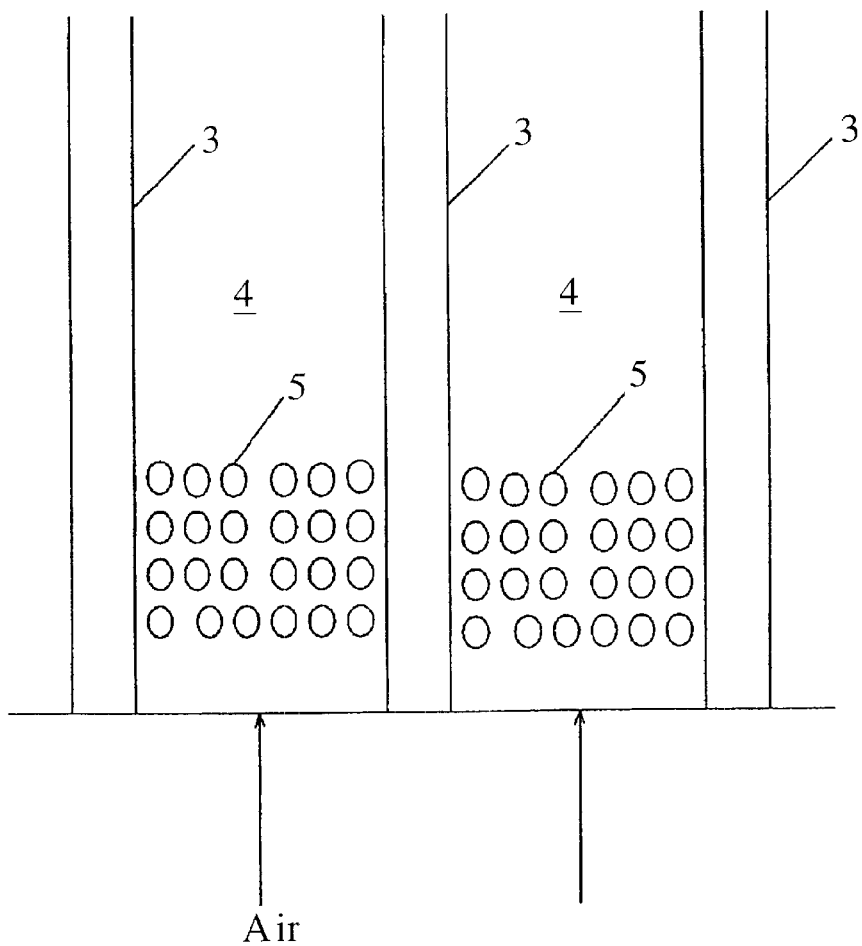
FIG. 4 is a schematic diagram illustrating an almost uniform condition of a catalyst changed from its uneven condition.

The flexible tube 6 is now illustrated. The diameter of the flexible tube 6 varies depending on the spaces between a reactor 1 and each next tube 3, between every neighboring tubes 3 and between a reaction tube 2 and each next tube 3 as shown in FIGS. 4 and 5 given below, the size of the catalyst, the feed rate of the catalyst and the hardness of the catalyst, and may be selected in the range of 50–300 mm. Further, its material may be selected from metals such as stainless steel and polymers such as polypropylene and polyethylene, though not limited to these materials.

The flexible tube 6 may be of a shape with or without bellows. After all, commercially avilable flexible tubes may be used satisfactorily.

The brush 8 is illustrated with reference to FIGS. 7–10. The brush 8 may function as, what is called, a cushion while a catalyst 5 passes down through a flexible tube 6. Therefore, any brush 8 may be used if it has a function of absorbing the falling speed of the catalyst 5 upon collision of the catalyst 5 with the brush 8.

Examples of the shape of the brush 8 having the aforementioned function are shown in FIGS. 7–10, though it is not limited to the shapes given in the drawings.

Figure 7:
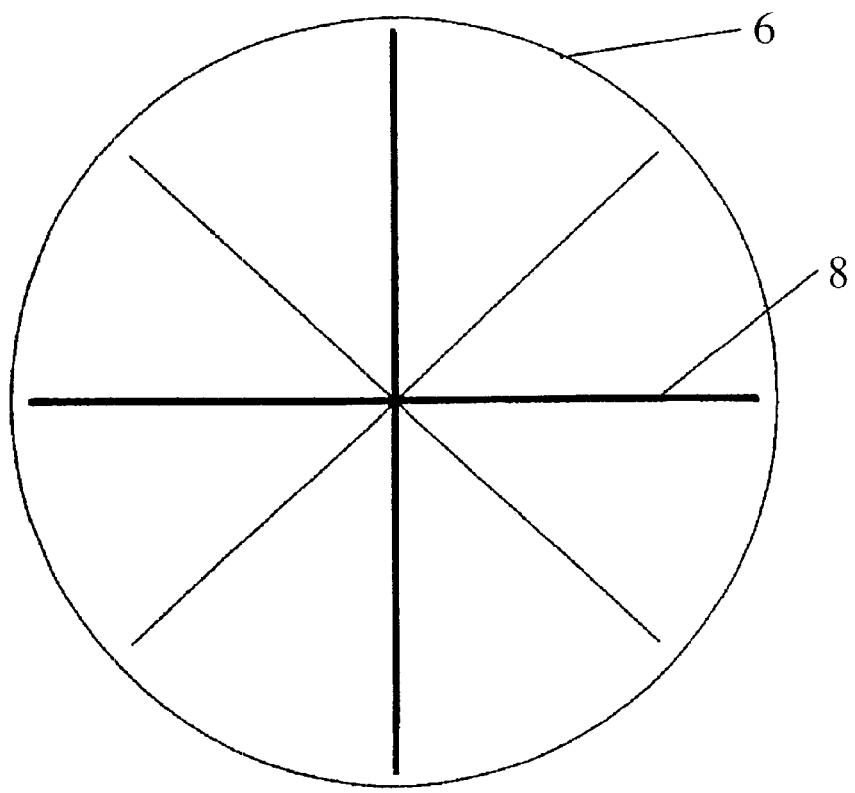
FIG. 7 is a schematic diagram illustrating an embodiment (type 1) of brushes.

A first example (referred to as type 1 hereunder) is shown in FIG. 7. In FIG. 7, a brush 8 is composed of four thin rods fitted to a jig 7 at an angle of approximately 90 degrees to each neighboring rod. Above and below a brush 8, further brushes 8 are mounted at each clockwise shifted angle of approximately 45 degrees relative to the brush 8. The interval between the brush 8 and the upper or lower brush 8 is 0.5–1.0 m based on their installed positions. Brushes made of metals such as stainless steel may preferably be used. It is preferred that the brushes are inclined downward.

Figure 8:
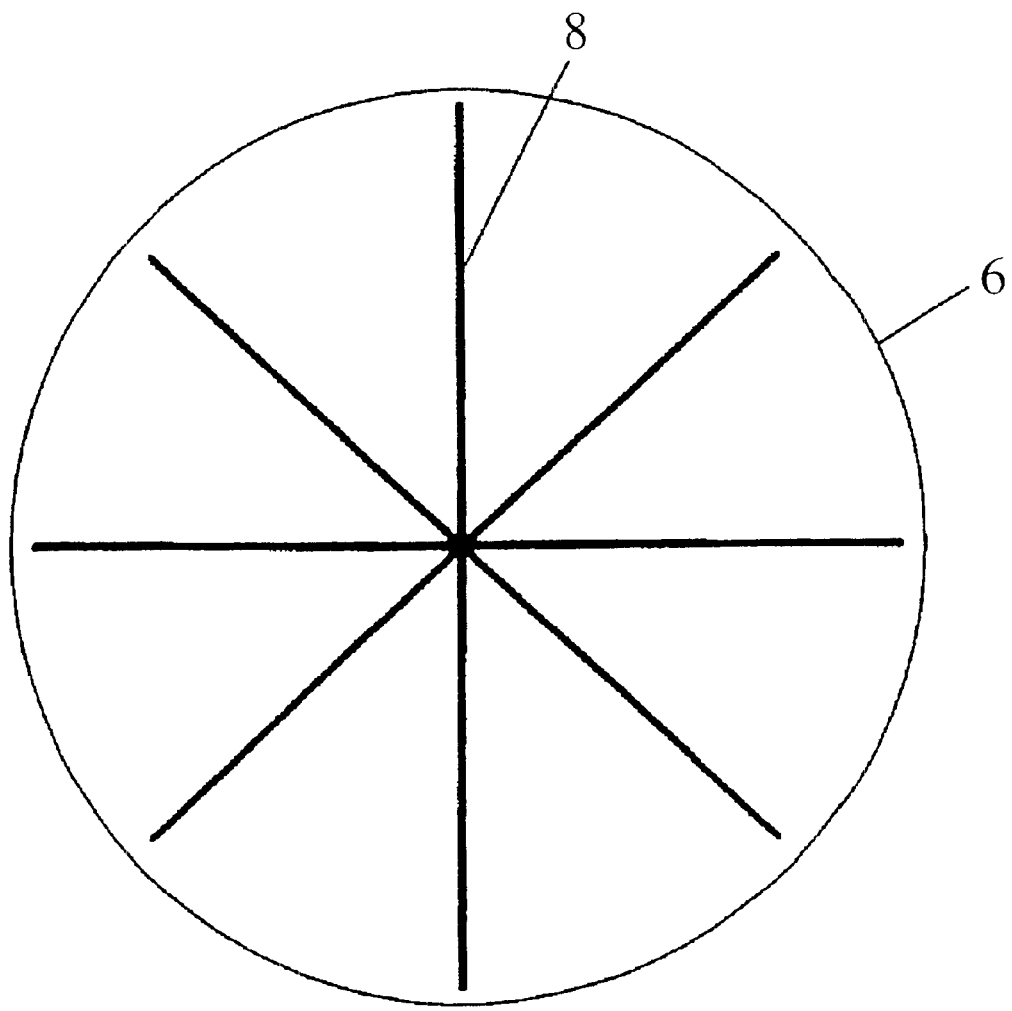
FIG. 8 is a schematic diagram illustrating an embodiment (type 2) of a brush.

A second example (referred to as type 2 hereunder) is shown in FIG. 8. In FIG. 8, the brush 8 is composed of eight rods attached to a jig 7 at an angle of approximately 45 degrees to each neighboring rod. Above and below a brush 8, further brushes 8 are installed at each clockwise shifted angle of approximately 22.5 degrees relative to the brush 8. The interval between a brush 8 and the upper or lower brush 8 is 0.5–1.0 m based on their installed positions. Brushes made of metals such as stainless steel may preferably be used. It is preferred that the brushes are inclined downward.

Figure 9:
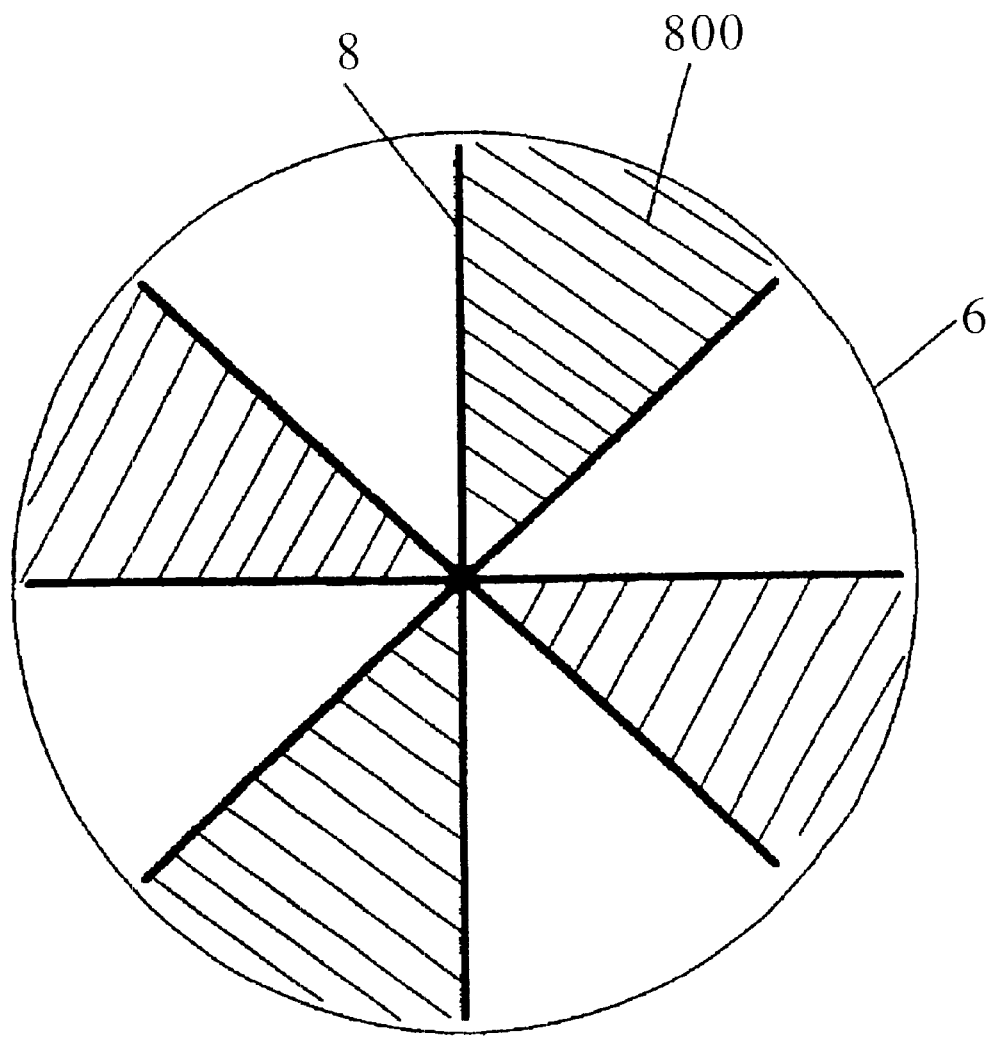
FIG. 9 is a schematic diagram illustrating an embodiment (type 3) of a brush.

A third example (referred to as type 3 hereunder) is shown in FIG. 9. In FIG. 9, the brush 8 is composed of eight rods fitted to a jig 7 at an angle of approximately 45 degrees to each neighboring rods. Of these rods, every other two neighboring rods are provided with a metal net 800 to extend the area of the brush 8 so that it is easily brought into contact with a falling catalyst 5. No particular limitation is imposed on the mesh size of the metal net. Any mesh sizes through which the catalyst can or cannot pass may be permitted. After all, any nets whereby the falling speed of the catalyst is decelerated may be employed. It is preferred that the metal nets are inclined downward.

Above and below a brush 8, further brushes 8 having metal net 800 are provided at a clockwise shifted angle of approximately 22.5 or 45 degrees. The interval between a brush 8 and the upper or lower brush is 0.5–1.0 m based on the installed positions. Brushes made of metals such as stainless steel and of polymers such as polypropylene may be used.

Figure 10:
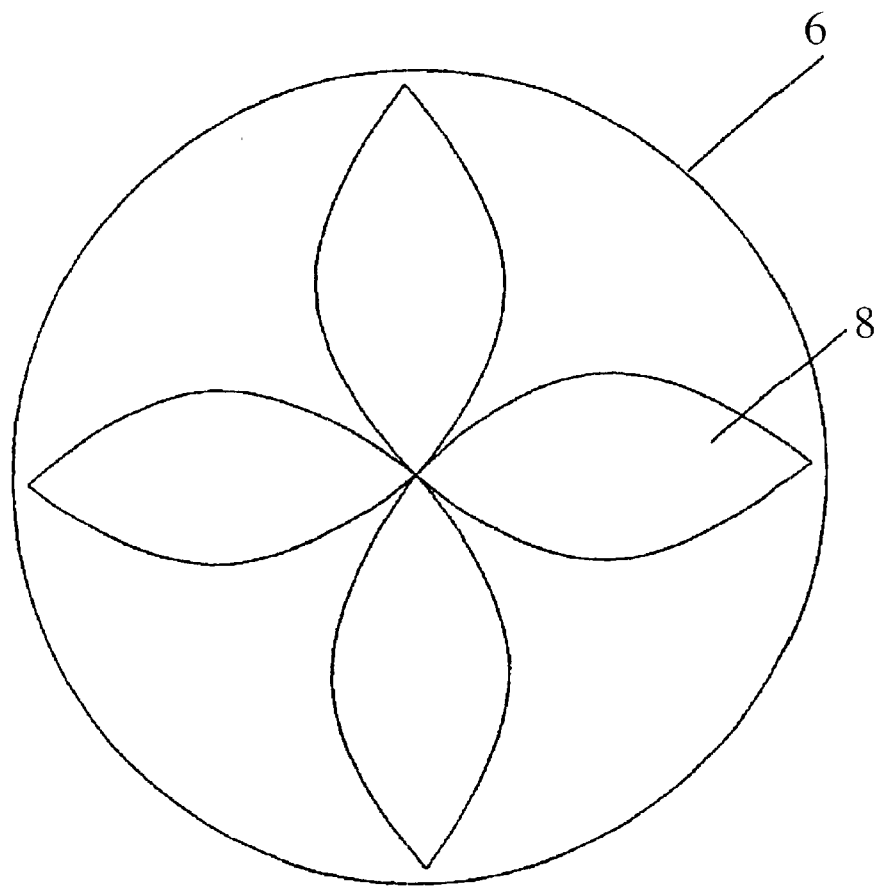
FIG. 10 is a schematic diagram illustrating an embodiment (type 4) of a brush.
Figure 11:
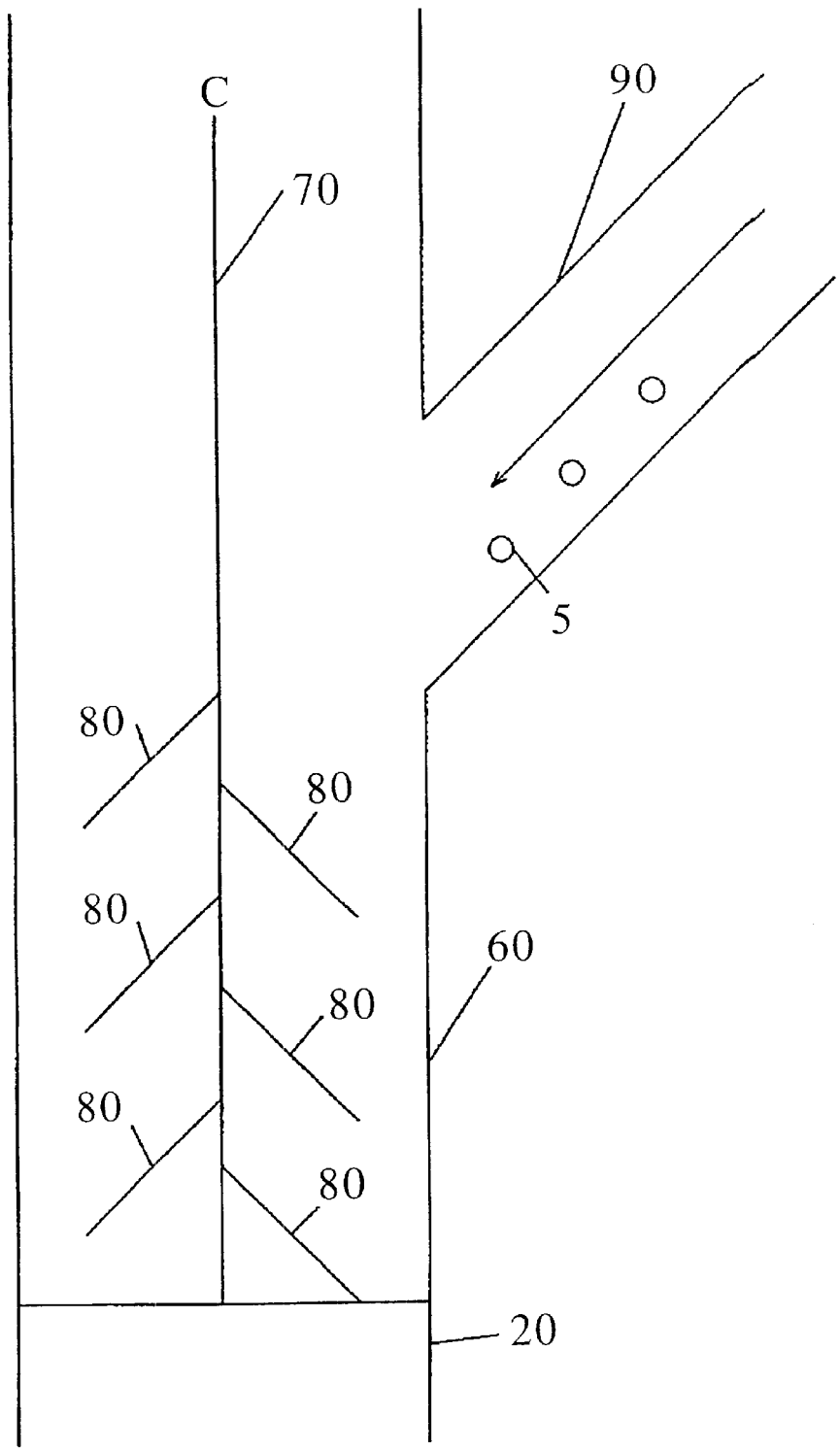
FIG. 11 is a diagram illustrating an embodiment of a conventional method.

A fourth example (referred to as type 4 hereunder): is shown in FIG. 10. In FIG. 10, the brush 8 is composed of four sets of thin plates provided at an angle of approximately 90 degrees to each neighboring set of rods. The brush 8 is extended in area so that it may easily be brought into contact with a falling catalyst 5. Above and below a brush 8, further brushes 8 are provided at each clockwise shifted angle of approximately 45 degrees relative to the brush 8. The interval between a brush 8 and the upper or lower brush 8 is 0.5–1.0 m based on their installed positions, and brushes made of polymers such as polypropylene may be used.

As described above, the material of brushes 8 can be determined by the hardness of the catalyst and may be selected from polymers such as polypropylene and polyethylene and metals such as stainless steel. Brushes 8 should preferably be elastic.

The size of a brush 8 is so determined that the space formed by the brush 8 and a flexible tube 6 may be smaller than the diameter or height of the catalyst. A larger space may unfavorably fail to decelerate the falling speed of the catalyst. In Example 1 described below, a flexible tube 6 with an inner diameter of 100 mm is used in packing a catalyst 5. In consequence, the diameter of the brush 8 is chosen to be 92 mm, the shape of the brush be type 1, and the installing interval be 0.5 m. Thus, the catalyst 5 is filled while the flexible tube 6 and brushes 8 are absorbing the impact to the catalyst 5.

The installing condition of brushes 8 to a jig 7 is such as to be one site in about every 1 m or one site in about every 0.5 m depending on the diameter of the flexible tube 6. The brushes 8 may use the latter interval in the range up to a few meters from the end of the flexible tube 6 and choose the former interval in the flexible tube 6 below the catalyst lead-in part 9. After all, these intervals may be used in combination.

The catalyst packing jig is now illustrated. In FIG. 1, a catalyst packing jig 10 may be installed on the ground or on or above a reactor 1. Where it is installed on the ground, only a longer flexible tube 6 is needed.

A catalyst 5 is sent to a flexible tube 6 through a catalyst lead-in part 9. The catalyst 5, restricted in speed in passing through the flexible tube 6 by brushes 8 fitted to a jig 7, is sent to the lower end of the flexible tube 6.

This end is maintained at a certain distance from the bottom of a reactor 1. This distance is determined by the fracture strength of the catalyst, and can be decided by preliminary tests illustrated in Examples 1–4 described below.

No particular limitation is placed on the kind and shape of the catalyst 5 employed in the present invention. The falling distance of the catlyst 5 may vary depending on its hardness, but may be decided from preliminary tests illustrated in Examples 1–4 described below.

As described above, a catalyst 5 falls through a flexible tube 6 linearly, helically or irregularly in accordance with the shape of brushes 8. However, brushes 8 with any shapes as selected above may absorb the impact to the catalyst, raising no particular problems.

The packing method of a catalyst is illustrated with reference to FIGS. 2–4.

Figure 2:
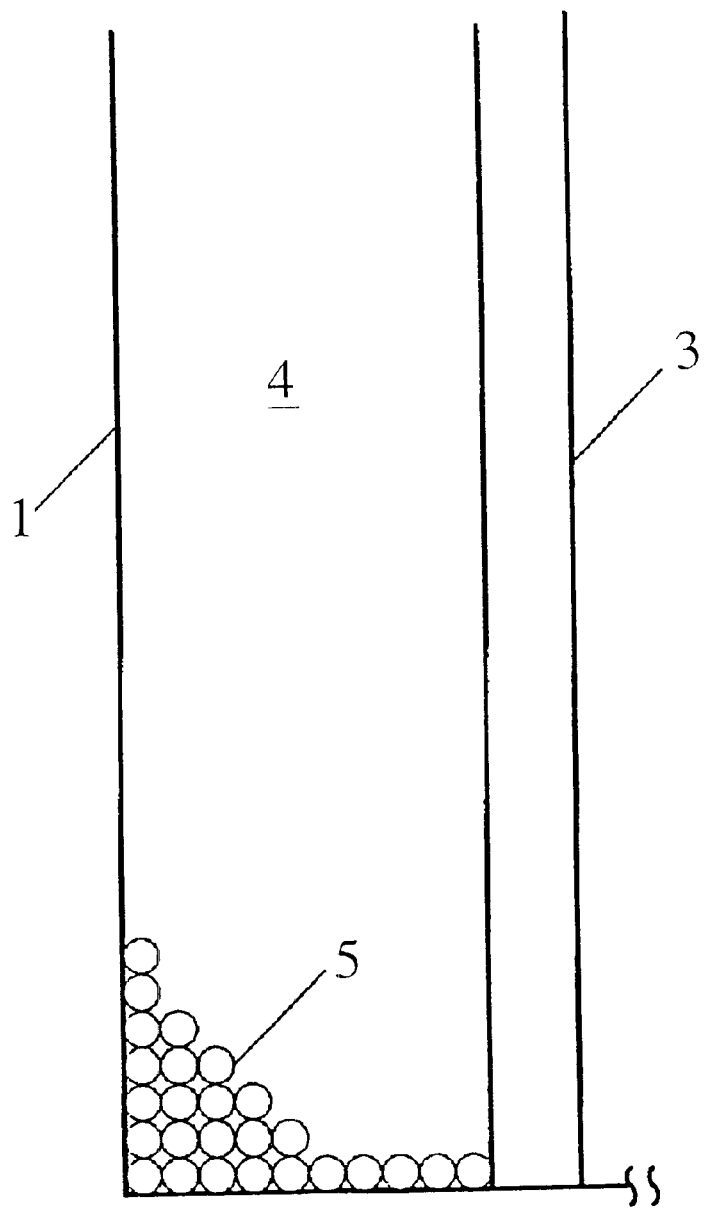
FIG. 2 is a schematic diagram illustrating an initial packing condition of a catalyst.

FIG. 2 is a schematic diagram illustrating an initial packing condition of a catalyst, in which a catalyst 5 having been held at a certain distance from the bottom of a reactor 1 and fed along the inner wall of the reactor 1 is now filling a space 4 toward tubes 3 while maintaining its angle of repose.

Figure 3:
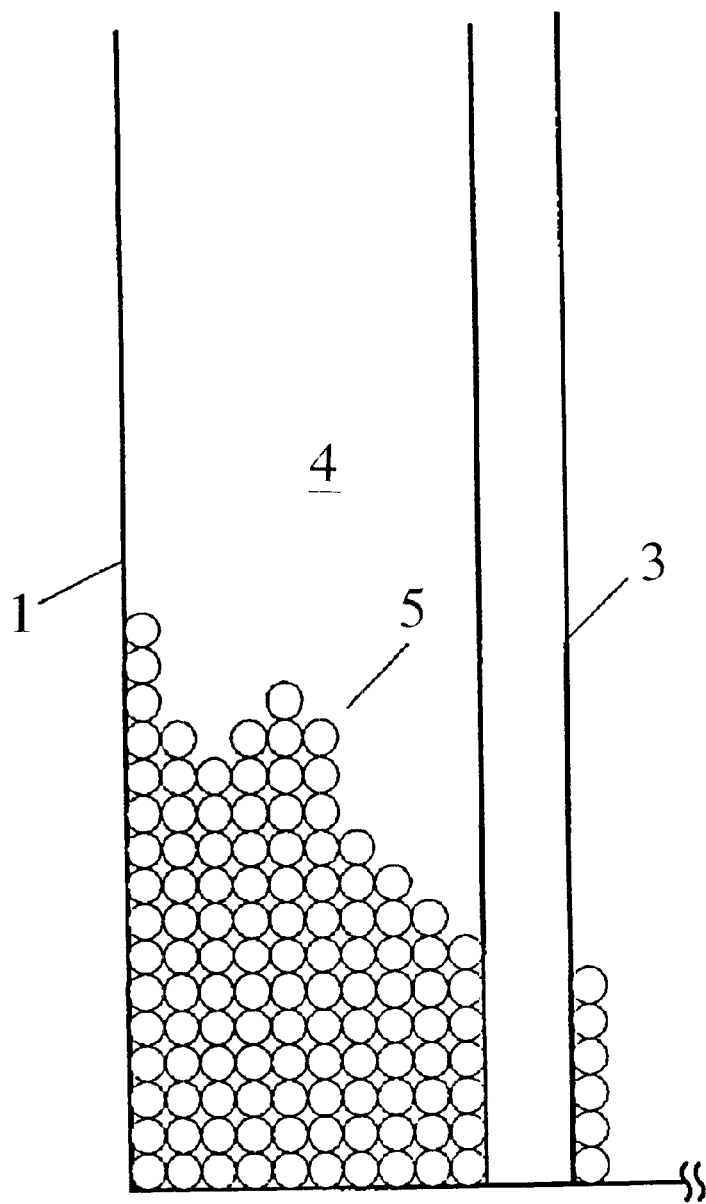
FIG. 3 is a schematic diagram illustrating a condition on the way to packing a catalyst.

FIG. 3 is a schematic diagram illustrating a condition on the way to packing a catalyst 5. In FIG. 3, the feed position of the catalyst 5 is more distant from the bottom of the reactor 1 than that in the initial packing condition shown in FIG. 2. In consequence, part of the catalyst 5 is occupying the bottom of the reactor toward a reaction tube 2.

In this way, the catalyst 5 is fed cylindrically along the inner wall of the reactor 1 toward the reaction tube 2 through the space formed by the inner wall of the reactor 1 and the outer walls of the tubes 3 as shown in the following FIG. 5 by means of the catalyst packing jig 10. When the distance is increased in order, a large amount of the catalyst 5 is fed finally to one place to form a mountain of the catalyst 5.

However, as soon as the catalyst 5 is piled beyond its angle of repose, the mountain of the catalyst 5 will collapse. As a result, the catalyst 5 is piled unevenly over the bottom of the catalytic reactor 1. The feed rate of the catalyst 5 may be 1.0–5.0 tons/h, though not limited to these quantities. After all, the catalyst may be so supplied as to be packed completely within a few days, or preferably within 1–3 days depending on the strength and amount of the catalyst packed.

In FIG. 3, when the distance of the concave parts over the bottom of the catalytic reactor 1 becomes approximately 1–2 m from the bottom, though it depends on the size, shape, kind and the like of the catalyst, the catalyst is started to fluidize as described below. Further, by carrying out a preliminary test, the starting time may also be decided by the feed rate to the reactor 1 determined from the properties of the catalyst 5, such as size, shape, angle of repose and the like, instead of the aforesaid distance. The catalyst 5 is fed to the space 4 while maintaining such a distance from the bottom that it is not broken even when allowed to fall down to the bottom, and covers the bottom unevenly while maintaining its angle of repose to the bottom.

The catalyst 5 thus-packed is fluidized so that its piling is converted from the uneven condition to an almost uniform condition in the reactor 1. FIG. 4 is a diagram showing schematically this condition.

In FIG. 4, the catalyst 5 is fluidized by a fluidizing gas, such as air and nitrogen, fed separately to the reactor 1. The fluidizing condition is selected from a superficial velocity of 10–30 m/s depending on the properties of the catalyst, such as size, shape and angle of repose. After the unevenness of the catalyst 5 has been substantially leveled, a further catalyst 5 is fed at a given position so that it is filled up to the flange face shown in FIG. 5 while being fluidized continuously or intermittently.

The packing operation of the catalyst 5 can be completed by the following procedure.

The catalyst 5 in the fluidized condition is filled up to the flange face in the reactor 1 shown in FIG. 5. Under this condition, the fluidizing gas is once reduced so as to make the fluidizing distance about several mm. This condition is maintained for 5–15 minutes. Then, the fluidizing gas is stopped and the catalyst is packed further up to the flange face. At this time, it is also possible to prevent falling of the catalyst 5 by providing an enclosure around the circumference of the reactor 1.

The present invention is illustrated more specifically by using examples. It is needless to say that the present invention is not limited only to the following examples.

EXAMPLE 1

Preliminary Test 1

In packing a catalyst in a reactor 1, the following preliminary test was carried out. The catalyst 5 had a cylindrical shape, a diameter of 5 mm, a length of 5 mm, an angle of repose of 30 degrees, and an apparent specific gravity of 1,000 kg/m$^3$.

Brushes 8 of type 1 were used at installing intervals of 0.5 m. Their material was polyethylene. A flexible tube of 1 m with an inner diameter of 100 mm was used, into which brushes of the type 1 were inserted. The catalyst 5 was fed in the flexible tube and eventually allowed to fall down onto an iron plate. Then, it was observed whether or not the catalyst was broken.

As a result, it was found that the catalyst 5 was not broken up to a falling height of 4 m even when caused to fall down onto an iron plate.

EXAMPLE 2

Preliminary Test 2

In Example 1, the catalyst was allowed to fall down onto an iron plate. In this example, however, it fell down onto a 30-mm layer of the catalyst piled on an iron plate. The test was carried out under the same conditions as those used in Preliminary Test 1. It was found that the catalyst was not broken up to a falling height of 4 m.

EXAMPLE 3

Preliminary Test 3

Using the catalyst 5 and brushes 8 of Example 1, the test was carried out by using a flexible tube with an inner diameter of 100 mm and setting the intervals of the brushes 8 at 1 m maximum, in order to confirm that no breakage of the catalyst 5 took place upon collision with the flexible tube 6 and the brushes 8. As a result, no breakage of the catalyst was found upon collision with the flexible tube 6 and the brushes 8.

From these results, it was confirmed that brushes 8 having any elastic shapes capable of absorbing the falling speed of the catalyst were satisfactorily used.

EXAMPLE 4

Preliminary Test 4

The test was carried out in the same manner as in Example 3, except that the brushes 8 of Example 3 were changed from type 1 to types 2–4. The result was the same as that in Example 3.

EXAMPLE 5

A methanol synthesis catalyst. as the catalyst 5 was packed from the bottom to the flange face in a reactor 1 having a diameter of 4.5 m and a height of 20 m from the bottom to the flange face, in which reactor a reaction tube 2 having a diameter of 1.0 m was provided in the center and 2,500 tubes 3 having a diameter of 0.05 m were arranged around it. The catalyst 5 used was the same as that used in Examples 1–4, and had a cylindrical shape, a diameter of 5 mm, a height of 5 mm, an angle of repose of 30 degrees, and an apparent specific gravity of 1,000 kg/m$^3$ Brushes 8 of type 1 were used at installing intervals of 1 m.

A catalyst packing jig 10 comprised a catalyst lead-in part 9 having a diameter of 0.2 m and a polyethylene-made flexible tube 6 having an inner diameter of 0.1 m. Brushes 8 inserted into the flexible tube were made of stainless steel. A polyethylene-made jig 7 fitted with the brushes 8 was inserted into the polyethylene-made flexible tube 6 to its lower end so that a 4 m-distance was maintained from the lower end to the bottom of the reactor 1. After preparation in this way, the catalyst 5 was fed at a rate of 5 tons/h along the circumference of the reactor 1 toward the reaction tube 2 succeedingly. The flexible tube and the jig 7 inserted in the flexible tube were properly separated off and united. After 10 hours, 50 tons of the catalyst was packed and then air was supplied so as to attain a superficial velocity of 20 m/s. Then, the catalyst was fed succeedingly in the reactor 1 at unspecified positions at the foregoing feed rate. After the catalyst 5 had been fed up to the flange face, the supply of air was stopped, and finally the catalyst 5 was additionally filled.

The time required for the packing was 46 hours and the total amount of the catalyst packed was 230 tons. Further, the void rate was 40%.

COMPARATIVE EXAMPLE 1

The catalyst was packed by the conventional sock method. The time required was 180 hours and the void rate was 45%.

The method and device for packing a catalyst according to the present invention gives effects as described below.

(1) In a reactor in which a plural number of reaction tube(s), cooling tubes, heating tubes or mixtures thereof are provided, a catalyst packing jig 10 comprising a catalyst lead-in part 9, a flexible tube 6, and a jig 7 fitted with brushes 8 that is inserted into the flexible tube is used in packing a catalyst uniformly in the space formed between the inner wall of the reactor and the outer walls of the foregoing tubes. In this way, the catalyst may first be packed unevenly but in a short time.

(2) The unevenness of the packed surface of the catalyst is leveled by fluidizing the catalyst. Further, a closest packing is possible due to the fluidization.

(3) Since a mild fluidizing condition of the catalyst is determined in a preliminary test from the hardness of the catalyst, and the like, it is possible to pack the catalyst regardless of the kind of the catalyst. Further, since the packing time of the catalyst is short, less abrasion of the catalyst is observed.

(4) Use of the flexible tube makes it easy to control the falling distance of the catalyst. Therefore, extremely little breakage is observed in the catalyst.

What is claimed is:

1. In a method for packing a catalyst comprising filling the catalyst in a space formed by an inner wall of a reactor and outer walls of tubes, in the reactor in which a plural number of at least one kind of the tubes selected from the group consisting of reaction tube(s), cooling tubes and heating tubes are provided, the steps of packing the catalyst in said space by passing the catalyst through a flexible tube provided in the inside of the reactor and having a means to absorb the impact to the catalyst and thereby feeding the catalyst along the inner wall of the reactor while maintaining such a falling distance that the catalyst may not be broken, and of fluidizing the catalyst thus packed in said space.

2. A device for packing a catalyst in a space formed by an inner wall of a reactor and outer walls of tubes, in the reactor in which a plural number of at least one kind of the tubes selected from the group consisting of reaction tube(s), cooling tubes and heating tubes are provided, comprising a means for packing the catalyst in said space by passing the catalyst through a flexible tube provided in the inside of the reactor and having a means to absorb the impact to the catalyst and thereby feeding the catalyst along the inner wall of the reactor while maintaining such a falling distance that the catalyst may not be broken, and a means for fluidizing the catalyst thus-packed in said space.

3. The device according to claim 2, wherein the flexible tube having a means to absorb the impact to the catalyst is a flexible tube with length-controllable bellows which has a length-controllable jig fitted with brushes in the inside thereof.

4. The device according to claim 3, wherein said brushes are composed of 4–8 thin rods fitted to a jig, the angle between neighboring rods being 45–90 degrees, and the catalyst is brought into contact with the rods so that the falling speed of the catalyst is reduced.

5. The device according to claim 3, wherein said brushes are fitted to a jig at vertical intervals in multi stages, and one brush is provided at a shifted angle of 45–90 degrees relative to its upper or lower brush.

6. The device according to claim 4, wherein the total area between neighboring two rods is covered alternately by a wire net.

7. The device according to claim 3, wherein said brushes are composed of a plurality of flat, thin sectorial plates having openings between all neighboring plates.

* * * * *